United States Patent [19]

Ichikawa et al.

[11] Patent Number: 4,964,420
[45] Date of Patent: Oct. 23, 1990

[54] DISTRIBUTOR

[75] Inventors: Minoru Ichikawa, Owariasahi; Kotaro Kashiyama, Inuyama; Tomomitsu Furukawa, Nagoya, all of Japan

[73] Assignee: Daido Metal Company, Nagoya, Japan

[21] Appl. No.: 431,728

[22] Filed: Nov. 3, 1989

Related U.S. Application Data

[63] Continuation of Ser. No. 293,678, Jan. 5, 1989, abandoned.

[30] Foreign Application Priority Data

Jan. 29, 1988 [JP] Japan .................................. 63-19079

[51] Int. Cl.$^5$ .............................................. F01M 1/00
[52] U.S. Cl. .................................... 137/171; 137/883; 184/6

[58] Field of Search ................ 188/352; 137/171, 883; 184/6, 6.23

[56] References Cited

U.S. PATENT DOCUMENTS

| | | | |
|---|---|---|---|
| 1,552,838 | 9/1925 | Gage | 137/171 X |
| 2,146,545 | 2/1939 | Leighton | 188/352 X |
| 2,598,961 | 6/1952 | Andrus | 137/833 |
| 2,601,216 | 6/1952 | White | 137/197 X |
| 2,652,069 | 9/1953 | Goheen | 137/171 X |
| 3,656,584 | 4/1972 | Lyden | 184/6 |
| 4,174,615 | 11/1979 | Kuhn | 188/352 X |

*Primary Examiner*—Alan Cohan
*Attorney, Agent, or Firm*—Browdy and Neimark

[57] ABSTRACT

A distributor is connected through a main pipe to a discharge port or discharge ports of a lubricating apparatus. Deaerating valves of the distributor are disposed in connection with at least one of a main pipe flow passage and discharge ports of the distributor.

1 Claim, 2 Drawing Sheets

DISTRIBUTOR

This application is a continuation of application Ser. No. 293,678, filed Jan. 5, 1989, now abandoned.

BACKGROUND OF THE INVENTION

The present invention relates to a distributor connected through a main pipe to a lubricating apparatus and used to continuously or intermittently supply a lubricating fluid to various parts to be lubricated from the lubricating apparatus and, more particularly, to a distributor of this kind that is provided with deaerating valves to facilitate the deaeration with respect to the interior of the piping system.

Hitherto, the deaeration with respect to the piping system of a lubricating apparatus is effected by loosening joining members at several joints of the piping system, such as a nipple connecting the main pipe to the distributor, or a blind screw closing the end of the main pipe, thereby purposely allowing part of the lubricating fluid to leak.

The conventional manner of deaeration, however, may fail to effect a perfect deaeration due, for instance, to the configuration or the position of the distributor, and, hence, it may fail to ensure that a predetermined amount of lubricating fluid is supplied to the parts to be lubricated through the distributor. Further, if the joining members happen to be left loose or fastened incompletely, this may lead to a further leakage of the lubricating fluid.

SUMMARY OF THE INVENTION

It is an object of the present invention to overcome the above-stated problems of the prior art.

The present invention provides a distributor connected to a discharge port or discharge ports of a lubricating apparatus through a main pipe of the piping system, comprising: a main pipe flow passage; discharge ports; and deaerating valves disposed in connection with at least one of the main pipe flow passage and the discharge ports.

DESCRIPTION OF THE PREFERRED EMBODIMENTS

Figure 1:
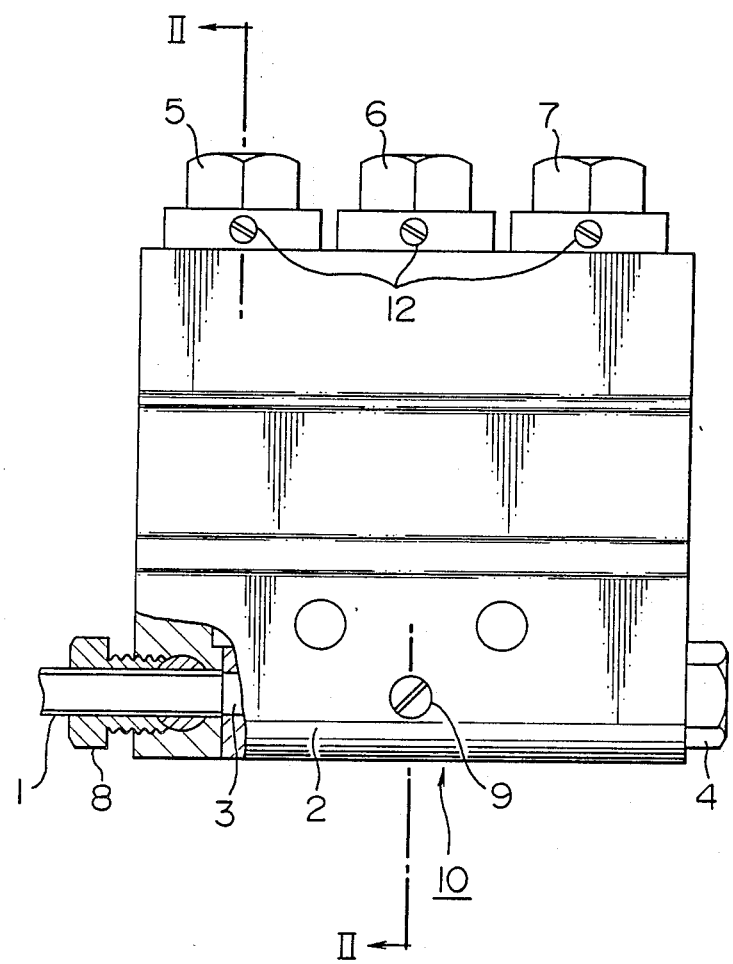
FIG. 1 is a partially-cutaway front view of a distributor in accordance with one embodiment of the present invention.
Figure 2:
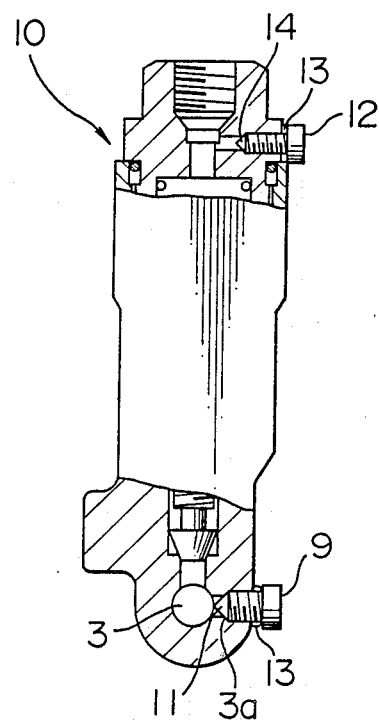
FIG. 2 is a partially sectioned view taken along the line II—II shown in FIG. 1.

Referring to FIGS. 1 and 2, there is shown a fixed-displacement distributor 10 in accordance with one embodiment of the present invention. Lubricating oil is allowed to flow from a discharge port of a lubricating apparatus (not shown) into the distributor 10 through a main pipe 1 of a piping system.

The distributor includes a main body 2, a main pipe flow passage 3 formed in the main body 2, a plurality of discharge ports 5, 6, and 7 connected to the main pipe flow passage 3, and a deaerating valve 9 disposed in the main pipe flow passage 3. The deaerating valve 9 is in the form of a headed screw having a conical leading end 11. A threaded hole associated with the valve 9 is formed in the main body 2 of the distributor 10 and has an end portion 3a which is also conical-shaped.

The deaerating valve 9 is threaded into the threaded hole formed in the main body 2. An O-ring 13 is interposed between the head of the screw forming the deaerating valve 9 and the main body 2, to prevent any leakage of the lubricating oil in the normal state of the distributor 10. The terminal end of the main pipe flow passage 3 formed in the main body 2 is closed by a blind screw 4. As best shown in FIG. 2, a plurality of deaerating valves 12, each having a similar configuration to that of the deaerating valve 9, may be provided in connection with the corresponding discharge ports 5, 6, and 7. Each deaerating valve 12 is in the form of a headed screw having a conical leading end 14, with an O-ring 13 being interposed between the head of the screw forming the valve 12 and the main body 2 of the distributor 10.

In operation, when it is required to effect the deaeration of the lubricating oil, the deaerating valve 9 connected to the main pipe flow passage 3 is loosened, thereby allowing the escape of air together with part of the lubricating oil. In the case where the deaerating valves 12 are provided in connection with the discharge ports 5, 6, and 7, the deaerating valves 12 may be individually loosened in accordance with the requirement, thereby effecting deaeration.

As described above, according to the present invention, deaeration can be performed effectively by loosening a deaerating valve which is connected to the main pipe flow passage of the distributor and is in the form of a relatively small, headed screw. Thus, the deaeration can be effected without requiring any loosening of the nipple connecting the main pipe to the distributor or the blind screw closing the end of the main pipe flow passage of the distributor, which ought not become loose from the viewpoint of their functions.

What is claimed is:

1. A distributor for distributing lubricating fluid through a main pipe of a piping system, said distributor having a main body and comprising:
    a main flow passage passing through the main body;
    discharge ports connected to said main flow passage;
    a blind screw for closing one end of said main flow passage; and
    deaerating valves disposed in connection with each of said main flow passage and said discharge ports, adapted to be selectively opened and closed wherein said deaerating valves are adapted to be opened to allow air and a part of the lubricating fluid to escape from said distributor, and
    wherein said deaerating valves are disposed substantially perpendicularly with respect to the respective main flow passage and discharge port with which the deaerating valves are connected.

* * * * *